US012593329B2

(12) United States Patent
Viger et al.

(10) Patent No.: US 12,593,329 B2
(45) Date of Patent: Mar. 31, 2026

(54) METHOD AND APPARATUS FOR MANAGING LOW LATENCY DATA TRANSMISSION IN A WIRELESS NETWORK

(71) Applicant: CANON KABUSHIKI KAISHA, Tokyo (JP)

(72) Inventors: Pascal Viger, Janze (FR); Julien Sevin, Saint Aubin du Cormier (FR); Mickael Lorgeoux, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 18/556,645

(22) PCT Filed: Mar. 11, 2022

(86) PCT No.: PCT/EP2022/056375
§ 371 (c)(1),
(2) Date: Oct. 20, 2023

(87) PCT Pub. No.: WO2022/223200
PCT Pub. Date: Oct. 27, 2022

(65) Prior Publication Data
US 2024/0188069 A1      Jun. 6, 2024

(30) Foreign Application Priority Data
Apr. 22, 2021      (GB) ..................................... 2105756

(51) Int. Cl.
| | |
|---|---|
| *H04W 72/12* | (2023.01) |
| *H04W 28/02* | (2009.01) |
| *H04W 74/04* | (2009.01) |

(52) U.S. Cl.
CPC ... *H04W 72/1221* (2013.01); *H04W 28/0278* (2013.01); *H04W 74/04* (2013.01)

(58) Field of Classification Search
CPC ............. H04W 72/21; H04W 28/0278; H04W 72/1221; H04W 74/04
See application file for complete search history.

(56) References Cited

U.S. PATENT DOCUMENTS

2018/0197659 A1      7/2018  Hayashi et al.
2018/0302918 A1*    10/2018  Shaheen ............... H04W 76/27
(Continued)

FOREIGN PATENT DOCUMENTS

| JP | 2020036093 A | 3/2020 |
|---|---|---|
| WO | 2018197659 A1 | 11/2018 |
| WO | 2020008049 A1 | 1/2020 |

OTHER PUBLICATIONS

Frank Hsu, et al., Traffic indication of latency sensitive applications, Sep. 1, 2020, IEEE 802.11-20/1067r5.

*Primary Examiner* — Syed S Ali

(74) *Attorney, Agent, or Firm* — Canon U.S.A., Inc. IP Division

(57) ABSTRACT

The present invention concerns a communication method in a wireless communication network, wherein the method comprises at a station: sending to an access point station a frame comprising a buffer status report reporting an amount of buffered data to be transmitted; receiving, from the access point station, an allocation of a resource unit for the transmission of the buffered data; and transmitting the buffered data in the allocated resource unit; wherein the frame sent to the access point station further comprises a time indication representative of a time limit for the transmission of the buffered data by the station.

22 Claims, 10 Drawing Sheets

AP's scheduled Service Periods (310)

(56)          References Cited

U.S. PATENT DOCUMENTS

| | | | | |
|---|---|---|---|---|
| 2019/0037433 | A1* | 1/2019 | Nagasaka | H04W 28/0252 |
| 2019/0268799 | A1* | 8/2019 | Hong | H04W 4/70 |
| 2019/0280831 | A1* | 9/2019 | Chu | H04L 5/0094 |
| 2020/0107263 | A1* | 4/2020 | Boger | H04W 52/0216 |
| 2020/0344640 | A1* | 10/2020 | Wu | H04W 72/21 |
| 2021/0345383 | A1* | 11/2021 | Tesanovic | H04W 72/21 |
| 2021/0352691 | A1* | 11/2021 | Li | H04L 5/0051 |
| 2022/0247656 | A1* | 8/2022 | Cui | H04W 72/21 |
| 2023/0189272 | A1* | 6/2023 | Shah | H04L 5/0044 |
| | | | | 370/329 |
| 2023/0319866 | A1* | 10/2023 | Sedin | H04W 16/10 |
| | | | | 370/329 |
| 2023/0422167 | A1* | 12/2023 | Baek | H04W 52/0216 |
| 2024/0137324 | A1* | 4/2024 | Zhang | H04L 47/2483 |

* cited by examiner

FIG. 5

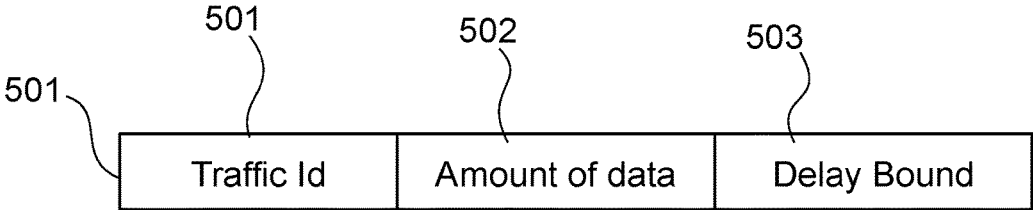

| Traffic Id | Amount of data | Delay Bound |

Control ID values (251)

| Control ID value | Meaning | Length of the Control Information Subfield (bits) |
|---|---|---|
| 0 | Triggered reponse Scheduling (TRS) | 26 |
| 1 | Operating mode (OM) | 12 |
| 2 | HE link adaptation (HLA) | 26 |
| 3 | Buffer status report (BSR) | 26 |
| 4 | UL power headroom (UPH) | 8 |
| 5 | Bandwidth query report (BQR) | 10 |
| 6 | Command and status (CAS) | 8 |
| 7 | Low-Latency BSR report (LL-BRS) | TBD |
| 8-14 | Reserved | |
| 15 | Ones need expansion surely (ONES) | 26 |

599

1

METHOD AND APPARATUS FOR MANAGING LOW LATENCY DATA TRANSMISSION IN A WIRELESS NETWORK

CROSS-REFERENCE TO RELATED APPLICATIONS

This application is a National Phase application of PCT Application No. PCT/EP2022/056375, filed on Mar. 11, 2022 and titled "METHOD AND APPARATUS FOR MANAGING LOW LATENCY DATA TRANSMISSION IN A WIRELESS NETWORK", which claims the benefit under 35 U.S.C. § 119(a)-(d) of United Kingdom Patent Application No. 2105756.7, filed on Apr. 22, 2021 and entitled "METHOD AND APPARATUS FOR MANAGING LOW LATENCY DATA TRANSMISSION IN A WIRELESS NETWORK". The above cited patent applications are incorporated herein by reference in their entireties.

FIELD OF THE INVENTION

The present disclosure is about managing low latency transmissions in a wireless network.

BACKGROUND OF INVENTION

Wireless communication networks have to fulfil increasing bandwidth and decreasing latency requirements, in particular in high-density environments. Multi-user (MU) schemes are being developed to address the increasing bandwidth requirement. The MU schemes allow a single access point (AP) to schedule MU transmissions, i.e. multiple simultaneous transmissions to or from non-AP stations, in the wireless network. For example, one of such MU schemes has been adopted by the IEEE in the 802.11ax-2021 standard.

Scheduling MU transmissions is based on the transmission needs declared by the non-AP stations to the AP. Such declaration is usually made using a Buffer Status Report (BSR). With the BSR mechanism, the non-AP stations report to the AP the amount of data held in an emission buffer ready to be transmitted to the AP, i.e. the amount of buffered uplink (UL) traffic. The BSR mechanism is consequently adapted to report the amount of data held in the emission buffers corresponding to a given Traffic Identifier (TID).

The information contained in the received BSRs makes it possible for the AP to schedule a MU UL transmission. This scheduling comprises selecting the non-AP stations to which MU UL transmissions are offered and to determine UL resource units to be allocated to each of the selected non-AP stations in terms of bandwidth and duration. Accordingly, each non-AP station having data to be transmitted is provided with the radio resources adapted for the transmission.

This mechanism is able to guarantee that a non-AP having data to transmit will get an opportunity to proceed to the transmission of these data. The AP, based on the knowledge of the amount of data to transmit at each non-AP station, manages the scheduling for an efficient use of the available radio resource. However, this scheduling is done on a best effort basis by the AP for providing the requested opportunities for transmission. It does not offer any guarantee on the latency, reliability or jitter of the transmission, which depends on the load of the wireless network.

SUMMARY OF THE INVENTION

The present invention has been devised to address one or more of the foregoing concerns.

According to a first aspect of the invention there is provided a method of communication method in a wireless communication network, wherein the method comprises at a station:

sending to an access point station a frame comprising a buffer status report reporting an amount of buffered data to be transmitted;

receiving, from the access point station, an allocation of a resource unit for the transmission of the buffered data; and transmitting the buffered data in the allocated resource unit;

wherein the frame sent to the access point station further comprises a time indication representative of a time limit for the transmission of the buffered data by the station.

In an embodiment, the resource unit is a Multi-User resource unit allocated within a transmission opportunity reserved by the access point station.

In an embodiment, the Multi-User resource unit is an uplink resource unit for transmitting buffered data to the access point station.

In an embodiment, the Multi-User resource unit is a direct link resource unit for transmitting buffered data to a station.

In an embodiment, the buffered data is transmitted to a non-access point station associated with the access point station.

In an embodiment, the buffered data is transmitted to another access point station through a Multi-access point transmission.

In an embodiment, the frame comprising the buffer status report is sent within the same transmission opportunity comprising the allocated resource unit.

In an embodiment, the buffer status report comprises:

an identifier indication identifying a type of the buffered data; and a buffer status report duration unit indication identifying a time unit used to express the time indication.

In an embodiment, the identifier indication identifies a class of buffered data.

In an embodiment, the identifier indication identifies a flow of buffered data.

In an embodiment, the buffer status report comprises:

an access category indication identifying the access category corresponding to the buffered data; and a data unit indication identifying a data unit used to express the amount of data.

In an embodiment, the buffer status report is included in a quality of service or high throughput control field of an 802.11 MAC Data frame.

According to another aspect of the invention there is provided a method of communication method in a wireless communication network, wherein the method comprises at an access point station:

receiving, in a frame sent by a station, a buffer status report reporting an amount of buffered data to be transmitted by the station; and transmitting to the station an allocation of a resource unit for the transmission of the buffered data;

wherein the frame sent by the station, and comprising the buffer status report, further comprises a time indication; and wherein the resource unit is allocated based on the received time indication.

In an embodiment, if the amount of data is not zero, the time indication is representative of a time limit for the transmission of the buffered data by the station and wherein the resource unit is allocated prior the time limit.

In an embodiment, if the amount of data is zero, the time indication is representative of a time limit until which an allocation of resource unit is not needed by the station.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

According to another aspect of the invention there is provided a computer program which upon execution causes the method of the invention to be performed.

According to another aspect of the invention there is provided a station in a wireless communication network, wherein the station comprises a processor configured for:

sending to an access point station a frame comprising a
        buffer status report reporting an amount of buffered
        data to be transmitted;
    receiving, from the access point station, an allocation of
        a resource unit for the transmission of the buffered data;
        and
    transmitting the buffered data in the allocated resource
        unit;
    wherein the frame sent to the access point station further
        comprises a time indication representative of a time
        limit for the transmission of the buffered data by the
        station.

According to another aspect of the invention there is provided an access point station in a wireless communication network, wherein the access point station comprises a processor configured for:

receiving, in a frame sent by a station, a buffer status
        report reporting an amount of buffered data to be
        transmitted by the station; and
    transmitting to the station an allocation of a resource unit
        for the transmission of the buffered data;
    wherein the frame sent by the station, and comprising the
        buffer status report, further comprises a time indication;
        and
    wherein the resource unit is allocated based on the
        received time indication.

According to another aspect of the invention there is provided a frame designed to be sent by a station of a wireless communication network to an access point station, the frame comprising a buffer status report field reporting an amount of buffered data to be transmitted by the station, wherein the frame further comprises a time indication field representative of a time limit for the transmission of the buffered data by the station or of a time limit until which an allocation of resource unit is not needed by the station.

In an embodiment, the time indication field is included into the buffer status report field.

In an embodiment, the time indication field is included in the frame and is distinct from the buffer status report field.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 5 illustrates a new format of report according to embodiments of the invention;

DETAILED DESCRIPTION OF THE INVENTION

Figure 1:
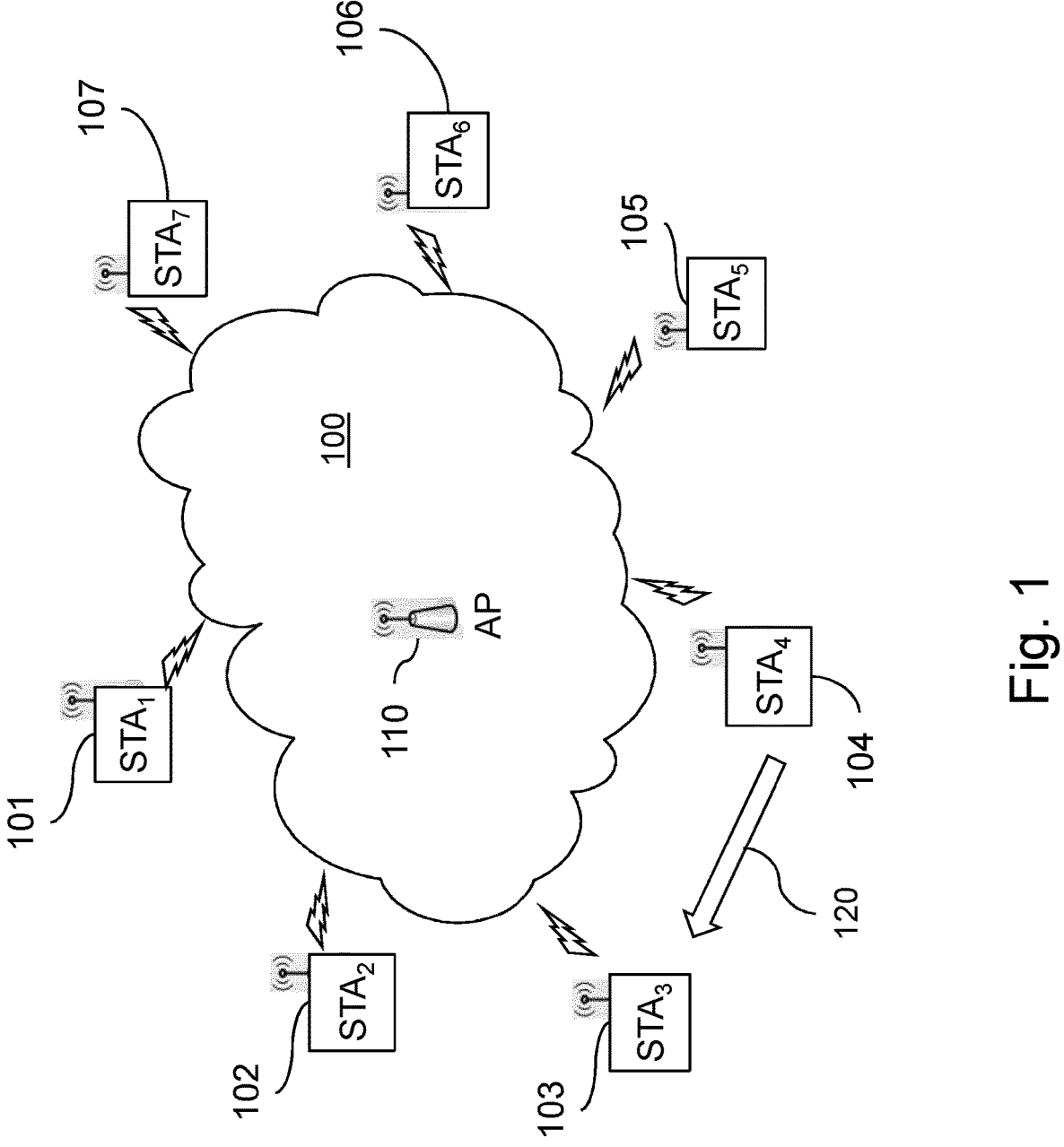
FIG. 1 illustrates an exemplary network environment, in which the invention may be implemented for delivering LLRS traffic.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. A SDMA system may utilize sufficiently different directions to simultaneously transmit data belonging to multiple user terminals, i.e. wireless devices or stations. A TDMA system may allow multiple user terminals to share the same frequency channel by dividing the transmission signal into different time slots or resource units, each time slot being assigned to different user terminal. An OFDMA system utilizes orthogonal frequency division multiplexing (OFDM), which is a modulation technique that partitions the overall system bandwidth into multiple orthogonal sub-carriers or resource units. These sub-carriers may also be called tones, bins, etc. With OFDM, each sub-carrier may be independently modulated with data. A SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers.

The teachings herein may be incorporated into (e.g., implemented within or performed by) a variety of apparatuses (e.g., stations). In some aspects, a wireless device or station implemented in accordance with the teachings herein may comprise an access point (so-called AP) or not (so-called non-AP station or STA).

Note that it is not excluded that an apparatus may act as an AP of one wireless network and at the same time may belong to another (neighbouring) wireless network as an associated STA. This may occur in the context of Multi-AP technology which consists in enabling some degree of collaboration among neighbouring APs in order to have a more efficient utilization of the limited time, frequency and spatial resources available. With such a technology, two neighbouring APs may share resources in terms of frequency or time and, in this way, prevents interferences. APs that collaborate together to share resources are referred to as coordinated APs. Moreover, the data transmission established by coordinated APs is referred as Multi-AP transmission.

While the examples are described in the context of WiFi® networks, the invention may be used in any type of wireless networks like, for example, mobile phone cellular networks that implement very similar mechanisms.

Low latency reliable services, LLRS, are services provided to a higher layer traffic stream that prioritize and deliver MSDUs (data units of this traffic stream) within a worst-case latency budget with a given reliability/packet delivery ratio (PDR) and low jitter. Traffic that may be concerned by LLRS includes latency sensitive data, i.e. data from applications such as gaming, media streaming, augmented reality, virtual reality, and so on.

FIG. 1 illustrates an exemplary network environment 100, in which the invention may be implemented for delivering LLRS traffic.

Each communication station 101-107 registers to a central station or access point (AP) 110 during an association procedure where the AP assigns a specific Association IDentifier (AID) to the requesting non-AP station. For example, the AID, e.g. a 16-bit value uniquely identifying the non-AP station, may be used to identify the stations in the frame exchanged. The AP 110 and the associated non-AP stations 101-107 may represent a basic service set (BSS) or an extended service set (ESS).

Once associated with the BSS, the communication stations 101-107, 110 exchange data frames over a radio transmission channel 100 of a wireless local area network (WLAN), under control of the AP 110. The radio transmission channel 100 is defined by an operating frequency band constituted by a single channel or a plurality of channels forming a composite channel.

Non-AP stations may also communicate directly via a direct wireless link (DiL for direct link), i.e. without the intervention of the AP relaying their messages. Exemplary situation of direct communications includes the presence of peer-to-peer (P2P) transmissions between non-AP stations having the same primary channel.

The stations 101-107, 110 may compete one against the other using EDCA (Enhanced Distributed Channel Access) contention, to gain access to the wireless medium 100 in order to be granted a transmission opportunity (TXOP) and then transmit (single-user, SU) data frames. The stations may also use a multi-user (MU) scheme in which a single station, usually the AP 110, is allowed to schedule a MU transmission, i.e. multiple simultaneous transmissions to or from other stations, during a TXOP granted in the wireless network. One implementation of such a MU scheme has been for example adopted in IEEE 802.11ax amendment standard, as the Multi-User Uplink and Downlink OFDMA (MU UL and DL OFDMA) procedures. Thanks to the MU feature, a non-AP station has the opportunity to gain access to the wireless medium via two access schemes: the MU scheme and the conventional Enhanced Distributed Channel Access—EDCA (Single User) scheme.

During the MU DL transmission on the granted communication channel, the AP performs multiple simultaneous elementary transmissions, over so-called resource units (RUs), to various non-AP stations. As an example, the resource units split the communication channel of the wireless network in the frequency domain, based for instance on Orthogonal Frequency Division Multiple Access (OFDMA) technique. The assignment of the RUs to the non-AP stations is signaled at the beginning of the MU Downlink frame, by providing an association identifier (AID) of a non-AP station (individually obtained by each station during its association procedure with the AP) for each RU defined in the transmission opportunity.

During the MU UL transmission, various non-AP stations can simultaneously transmit data to the AP over the resource units forming the communication channel. To control the MU UL transmission by the non-AP stations, the AP previously sends a control frame, known as a Trigger Frame (TF). The Trigger Frame allocates the resource units to the non-AP stations of the same BSS, using Association IDentifiers (AIDs) assigned to them upon registration to the AP and/or using reserved AIDs designating a group of non-AP stations. The TF also defines the start of the MU UL transmission by the non-AP stations as well as the length thereof.

A variant to trigger UL transmission relies on the use of a TRS (standing for Trigger Response Scheduling) control subfield. Such TRS control subfield is added to the DL data frames the AP sends to non-AP stations over resource units (MU DL transmission) in order to provide resource unit allocations to the addressee non-AP stations for a subsequent MU UL transmission. Each TRS subfield only allocates a single resource unit (and provides transmission parameters) for the addressee non-AP station that receives the DL data frame.

The non-AP stations may represent various devices such as gaming client, augmented/virtual reality headset, smartphones, wireless display and some of them have to exchange (i.e. transmit or/and receives) low-latency or LLRS traffic over time. LLRS traffic has more constrained QoS requirements regarding for instance PDR, jitter and latency, than non-LLRS traffic coexisting in the WLAN 100.

The Single User (SU) scheme of 802.11 network protocol allows a direct link (DiL, also called peer-to-peer (P2P) transmission) to be performed wherein the data (MAC) frames are addressed using, for example, the 48-bit IEEE MAC address of the destination station. With regards to the figure, two non-AP stations 103, 104 may also communicate directly via a direct wireless link (DiL for direct link) regardless of whether both non-AP stations belong to the same BSS or ESS. In a variant, direct communications between non-AP stations can be implemented without the use of the access point (known as an Ad-hoc mode). For instance, WiFi-Direct standard allows devices to communicate directly over the 802.11 wireless medium without the need for any AP. Even if P2P flows are usually not numerous, the amount of data per flow tends to be important, typically low-compressed video, from 1080p60 up to 8K UHD resolutions, and low latency can also be expected. In a variant, such P2P transmission is enrolled inside a MU communication scheme that is to say under coordination of the Access Point.

The description below mostly concentrates on the trigger frame to trigger an UL transmission, rather than the TRS control subfield. However, one skilled in the art is able to adapt the teachings below to the case of the TRS control subfield. In addition, teachings below are also applicable to the case of any communicated traffic, including P2P traffics.

Management of quality of service (QoS) has been introduced at station level in the wireless networks, through the EDCA mechanism defined in the IEEE 802.11e standard. EDCA (Enhanced Distributed Channel Access) mechanism defines four traffic access categories (ACs) or «priorities» to manage access to the medium: a voice access category (AC_VO), a video access category (AC_VI) both reserved for real-time applications (e.g. voice or video transmission), a best effort access category (AC_BE) for standard applications and a background access category (AC_BK) when traffic is low.

Four corresponding emission buffers, or transmission/traffic queues or buffers, are provided: each AC has its own traffic queue/buffer to store corresponding traffic as data frames such as MSDUs or A-MSDUs to be transmitted on the network. The data frames, namely the MSDUs, incoming from an upper layer of the protocol stack are each provided with an 802.1D priority or User priority (UP) or traffic type (TID—standing for Traffic Identifier) taking values in the range 0-7. Based on their TID, the MSDUs are mapped, using mapping rules, onto one of the four AC queues/buffers to be stored in the mapped AC buffer. Of course, another number of traffic queues may be contemplated.

Since the AP performs contention on behalf of the non-AP stations in the Uplink OFDMA, it should be aware of both the non-AP stations having (in their buffers) uplink traffic (MSDUs) to transmit and the amount of buffered UL traffic.

The 802.11 standard proposes that the 802.11ax non-AP stations send a buffer status report (BSR) to the AP to report the buffered traffic.

Figure 2:
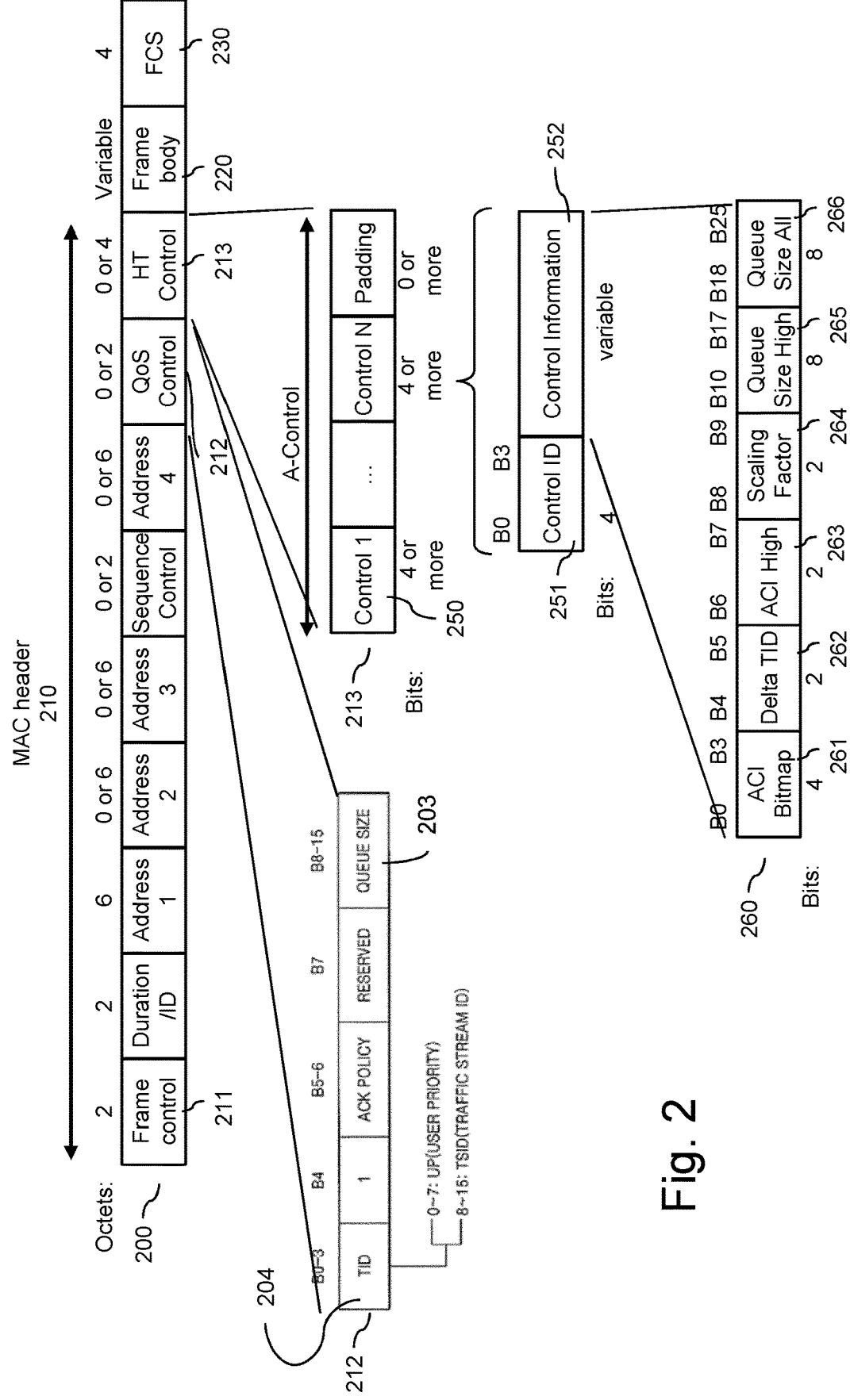
FIG. 2 illustrates the MAC data frame structure.

The BSR is included in a BSR control field provided in MAC data frames, as illustrated in FIG. 2.

The MAC data frame 200 comprises a MAC header 210, a frame body 220 and a FCS field 230. The MAC header 210 includes, amongst other fields, a Frame Control header 211, a QoS control field 212 and a HT control field 213. The QoS control field 212 is the original 802.11e format that may be used by a non-AP station of any 802.11 technology to report a buffer status.

Alternatively, or possibly additionally, a non-AP station starting from 802.11ax version (including further releases such as 802.11be/EHT) may use the HT control field 213 to do so.

It is recalled that an 802.11 station (AP and non-AP station) maintains four Access Categories (ACs), and thereby four corresponding emission buffers (or transmission/traffic queues or buffers). Each AC has its own traffic queue/buffer to store corresponding data frames to be transmitted on the network. The data frames, namely the MSDUs (MAC service data units), incoming from an upper layer of the protocol stack are mapped onto one of the four AC queues/buffers and thus input in the mapped AC buffer. Therefore, an 802.11 station supports a traffic prioritization similar to DiffServ (Differentiated Services), and the mapping is performed between one of the eight priorities of traffic class of the incoming MSDU (TID values between 0-7 are considered User Priorities and these are identical to the IEEE 802.1D priority tags) onto a corresponding one of the four ACs.

802.11 Legacy BSR Format

As represented in the Figure, the QoS control field 212 is made of two bytes, including the following information items:

Bits B0 to B3 are used to store a traffic identifier (TID) 204 which identifies a traffic stream. The traffic identifier takes the value of the transmission priority value (User Priority UP, value between 0 and 7) corresponding to the data conveyed by the data frame or takes the value of a traffic stream identifier, TSID, value between 8 and 15, for other data streams;

Bit B4 is used by a non-AP station to differentiate the meaning of bits B8-B15 and is detailed here below;

Bits B5 and B6 define the ACK policy subfield which specifies the acknowledgment policy associated with the data frame. This subfield is used to determine how the data frame has to be acknowledged by the receiving station; normal ACK, no ACK or Block ACK.

Bit B7 is reserved, meaning not used by the current 802.11 standards; and

If bit B4 is set to 1, bits B8-B15 represent the "queue size" subfield 203, to indicate the amount of buffered traffic for a given TID at the non-AP station sending this frame. The queue size value is the total size, rounded up to the nearest multiple of 256 octets and expressed in units of 256 octets, of all packets buffered for the specified TID. The access point may use this information to determine the next TXOP duration it will grant to the station. A queue size of 0 indicates the absence of any buffered traffic for that TID. A queue size of 255 indicates an unspecified or unknown size for that TID 204.

Alternatively to the "queue size" usage, if bit B4 is set to 0, bits B8-B15 represent the "TXOP Duration Requested" subfield. It indicates the duration, in units of 32 μs that the sending station determines it needs for its next TXOP for the specified TID. Of course, the "TXOP Duration Requested" provides an equivalent request as the "queue size", as they both consider all packets buffered for the specified TID.

The following description will be done with "queue size" format for the buffer status reports, as it is the largest usage (the "TXOP Duration Requested" format is deprecated for MU usage). The 802.11e MAC frame format, and more particularly the QoS Control field 200, have been kept for the up and comer standard versions as now described.

The legacy BSR according to 802.11e can handle one TID report per MSDU frame, this is one reason why enhancements were later provided by 802.11ax version.

802.11ax BSR Format

The HT-Control field 213 may aggregate multiple control fields, resulting in a sequence of one or more Control subfields 250. The length of the aggregated control field (A-Control field) 213 is equal to 30 bits.

Each Control subfield 250 includes a Control ID 251 subfield indicating the type of information carried in the Control Information subfield 252 that follows. Padding bits are added if necessary to reach the 30 bits of the A-Control field.

Various type of information may thus be provided through the A-Control field 213 depending on the Control ID 251. For instance, operating mode may be indicated in Control Information subfield 252 when Control ID 251 is 1. Also, power data may be indicated in Control Information subfield 252 when Control ID 251 is 4.

If Control ID subfield 251 is 3, Control Information subfield 252 of the Control subfield 250 contains buffer status information in the format of a BSR control field shown in the figure under reference 260.

A non-AP station may report the buffer status for a preferred AC or for all AC queues.

The Buffer Status Information 260 is made up of five subfields: ACI Bitmap 261, Delta TID 262, ACI High 263, Scaling Factor 264, Queue Size High 265 and Queue Size All 266.

A number $N_{TID}$ of traffic identifiers for which there is buffered uplink, UL, traffic, is signaled using the first two subfields in the BSR control field 260, namely ACI Bitmap 261 and Delta TID 262.

ACI Bitmap subfield 261 has four bits and indicates the access categories for which the buffer status is reported. Each bit of the ACI Bitmap subfield 261 is associated with one of the four ACs and is set to 1 to indicate that the buffer status of the corresponding AC is included in the Queue Size All subfield 266, otherwise it is set to 0.

Exception is made for the particular case where the buffer statuses for all eight TIDs are included in the Queue Size All subfield 266. In that case ACI Bitmap subfield=0 is combined with Delta TID subfield 262 set to 3.

Delta TID subfield 262 together with the values of the ACI Bitmap subfield, indicate the number of TIDs for which the non-AP station is reporting the buffer status. The table below gives the relationships between these two subfields and the number of TIDs. The table comes from table 9-24d of document 802.11ax, version 6.0.

| Number $N_{bit}$ of bits in ACI Bitmap subfield 261 that are set to 1 | Mapping of Delta TID subfield value and number of TIDs, $N_{TID}$ |
|---|---|
| 0 | Values 0 to 2 are not applicable; Value 3 indicates 8 TIDs (i.e., all ACs have traffic) |
| 1 | Value 0 indicates 1 TID; Value 1 indicates 2 TIDs; Values 2 to 3 are not applicable; |
| 2 | Value 0 indicates 2 TIDs; Value 1 indicates 3 TIDs; Value 2 indicates 4 TIDs; Value 3 is not applicable; |
| 3 | Value 0 indicates 3 TIDs; Value 1 indicates 4 TIDs; Value 2 indicates 5 TIDs; Value 3 indicates 6 TIDs; |
| 4 | Value 0 indicates 4 TIDs; Value 1 indicates 5 TIDs; Value 2 indicates 6 TIDs; Value 3 indicates 7 TIDs; |

ACI High subfield 263 is used to indicate the ACI (Access Control Identifier) of a preferred AC for which the amount of buffered traffic is specified in Queue Size High subfield 265.

Scaling Factor subfield 264 indicates the unit SF, in octets, of Queue Size High and Queue Size All subfields 265, 266.

Queue Size High subfield 265 indicates the amount of buffered traffic, in units of SF octets, for the AC identified by ACI High subfield 263 that is intended for the station (usually the AP) identified by the receiver address of the MAC frame 200.

Queue Size All subfield 266 indicates the amount of buffered traffic, in units of SF octets, for all the ACs identified by ACI Bitmap subfield 261 that is intended for the station (usually the AP) identified by the receiver address of the MAC frame 200.

The queue size values set in Queue Size High and Queue Size All subfields 265, 266 are the total sizes, rounded up to the nearest multiple of SF octets, of all MSDUs and A-MSDUs buffered at the non-AP station reporting its buffer statuses.

The standardized 802.11ax BSR remains dedicated to the reporting of buffer statuses from one (or several) of the 4 queues. This format is no longer compliant with TID values greater than 7, whereas the legacy format is still. For instance, upper layers may provide data frame, MSDU, with 802.1D User Priority (UP) values taken in the reserved 8-15 values (known as TSID) for low latency delivery services.

Historically, the IEEE 802.11e introduced the usage of TSID along with the traffic specification (TSPEC) for a contention-free mechanism called HCCA (standing for HCF Controlled Channel Access), which has become deprecated with 802.11ax. The 802.11ax provided a centralized polling scheme by the AP for MU communications, but remains deficient in handling a real QoS as required for low latency services.

As 802.11be aims to assess its ability to handle Real-Time (RT) traffic, using TSID is an easy traffic indication means for selecting the appropriate transmission mode of operation. A possibility is to refine TSPEC (Traffic SPECification), as a set of QoS parameters that are used to describe a TS (Traffic Stream) seen as a specific data flow between two stations.

The station may include the TSPEC in some action frames, like the Add Traffic Stream (ADDTS), to perform an admission request or closure of the characterized traffic.

Once the access point has obtained traffic specifications and/or buffer reports for a set of stations of its BSS, it can specifically poll them through scheduled resource unit allocation. This allocation is transmitted using a trigger frame for data transmission. Then, the stations with allocated resource units emit their buffered data inside their allocated resource unit or units. As the MU UL/DL OFDMA transmissions on all the resource units of the composite channel should be aligned in time, the station may provide padding payload in case of no more data can be sent inside the assigned resource unit. This may happen, for example, if no more data is buffered for transmission, or if the emitting station doesn't want to fragment any remaining data frame.

The access point is able to manage the resource unit size according to the reported needs. The access point may schedule the uplink resource unit(s) during the TXOP period to any of the stations having sent a report.

For latency sensitive and periodic UL traffic, latency is especially not guaranteed for fluctuant traffic. This is also true for any traffic where the transmitter is to be scheduled by the AP, as example for P2P traffic (contrary to downlink OFDMA wherein the access point knows directly the quantity and the timing for sending multiple data to multiple stations).

The 802.11 classical usage for constructing/using such reports is no longer adapted to the low-latency transmission requirement, as only the global needs is reported inside the queue size information of their buffer reports or theoretically but non-realistic flow characteristic information delivered by the TSPEC. Anyway, as will become apparent later in the disclosure, the current format of the various reports of the art is not adapted for conveying information about low-latency communications.

This conducts to misinform the access point about real expected resources, which then is misled for allocation resource units to 802.11 stations.

Figure 3:
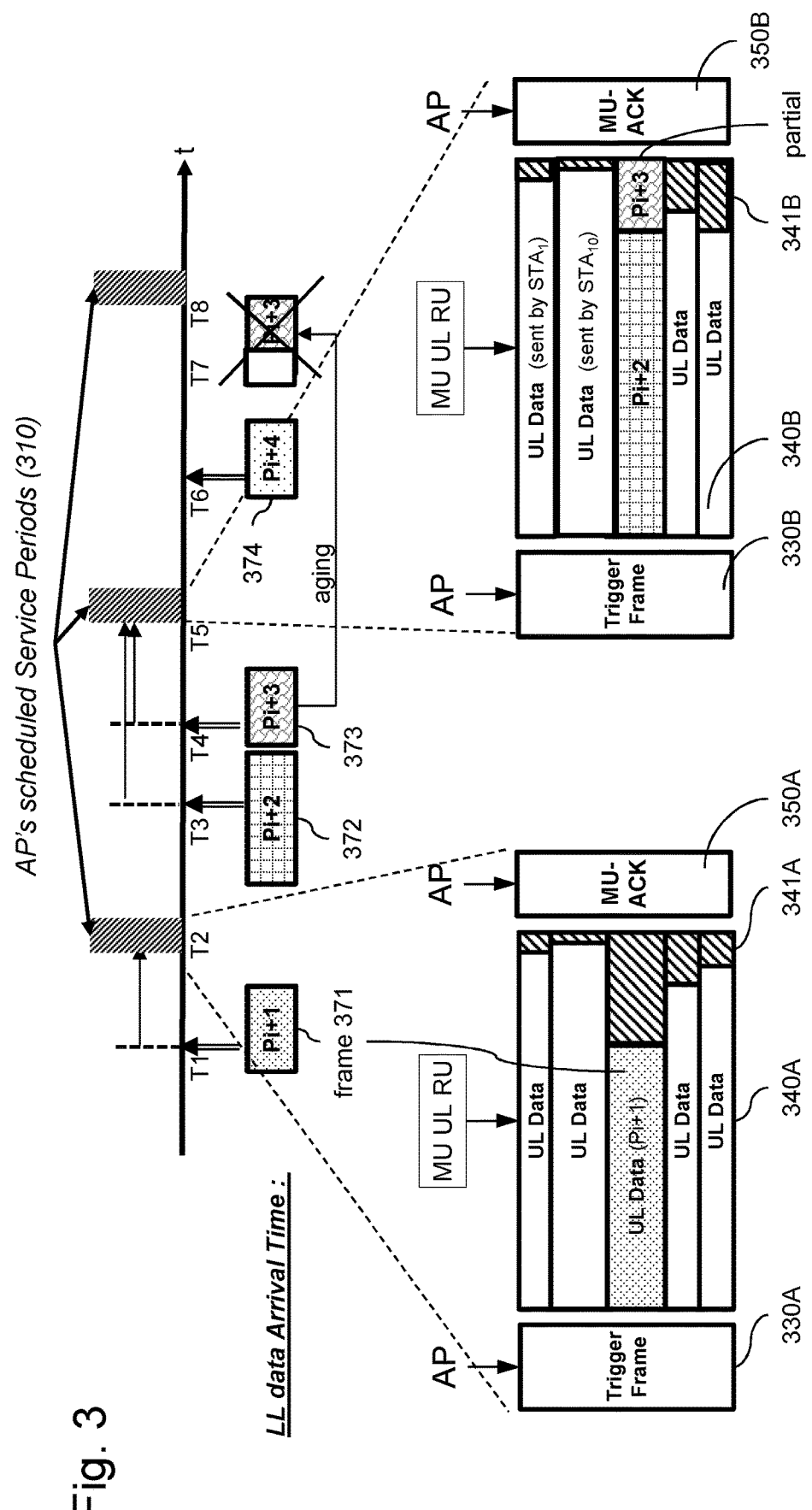
FIG. 3 illustrates the time line of an example of scheduled transmission between a station and an access point station.

FIG. 3 provides an illustration of this deficiency.

Low latency reliable services, LLRS, are services provided to a higher layer traffic stream that prioritize and deliver MSDUs (data units) within a worst-case latency budget with a given reliability/packet delivery ratio (PDR) and low jitter.

Some low latency, LL, measures are being studied in order to prioritize LLRS traffic within a BSS (Basic Service Set) with a view of meeting QoS constraints. For instance, specific LLRS resources, such as frequency, temporal or spatial resources, may be assigned to LLRS traffic and thus used by non-AP stations emitting or receiving the LLRS traffic.

In this scenario, the AP schedules reserved service periods 310. It may announce the starting time and the ending time of each period. The reserved service period 310 may be fully dedicated to LLRS traffic exchange, or in variant may allow both LLRS traffic and not-LLRS traffic.

The reserved service period may preferentially be a Target Wake Time (TWT) service period (also referred to as TWT SP, LL TWT SP or Restricted TWT SP). In other words, TWT operation is specialized to allow an AP to use enhanced medium access protection and resource reservation mechanisms to provide more predictable latency, reduced worst case latency and/or jitter, with higher reliability for latency sensitive traffic.

Target Wake Time enables devices to determine when and how frequently they will wake up to send or receive data. TWT allows an AP to manage activity in the network, in order to minimize medium contention between Stations (STAs), and to reduce the required amount of time that an STA in the power-save mode needs to be awake. Thanks to this mechanism, the TWT requesting STA can doze except during the TWT service period (SP) intervals.

TWT SPs can be either individually agreed or broadcast. An individual TWT SP is a specific time or set of times negotiated between two individual stations (referred to as TWT requesting STA and TWT responding STA) and at which the stations are expected to be awake in order to exchange frames with each other. During negotiations, they transmit to each other a special information element (TWT IE) which contains TWT parameters and can be interpreted as request, suggestion, demand, alternation, acceptation, dictation, or rejection. Either the AP or the STA can tear down the TWT by transmitting a TWT Teardown frame. The broadcast TWT is similar to an individual TWT except that the specific time or set of times are not negotiated between stations but directly broadcast by an AP to multiple non-AP stations, e.g. using a beacon frame. In that case, the AP may use another mechanism based on a TIM element to indicate the set of STAs towards which the AP is going to transmit (Downlink data—DL) or which the AP is going to trigger for uplink traffic. If a STA is not indicated in a TIM element, it means that it will not be solicited within the next TWT SP.

T2, T5, T8 are the starting time of the LL SPs 310 as announced by the AP.

T1, T3, T4, T6 are the arrival time of frames 371, 372, 373, 374 from the higher layer stack, locally at a non-AP station. Such frames are application frames, consisting in a variable set of MSDUs (size may vary). Timing of arrival are not regular too.

Sequences (330A-340A-350A) and (330B-340B-350B) illustrate an exemplary LL period 310 during which the AP contends for access to the medium prior the LL SP. For the sake of illustration, only communications where transmitters are not the AP are displayed (that is to say, MU DL traffic are not represented).

Once the access point has obtained access onto the wireless medium, it can specifically poll TWT concerned stations through scheduled resource unit allocation. This allocation may be transmitted using a trigger frame 330x (x being A or B) for data transmission. Then, the stations with allocated resource units emits their buffered data 340x inside their allocated resource unit. As the MU UL/MU P2P OFDMA transmissions on all the resource units of the composite channel should be aligned in time, the stations may provide padding payload 341x in case of no more data can be sent inside their assigned resource unit.

The frame 371 may be transmitted entirely in a MU UL RU 340A of the first LL SP 310.

Before the next TWT LL SP 310 scheduled at T5, several application frames are waiting to be transmitted (372 and 373). This unpredictable traffic cannot be handled entirely inside a MU UL RU of the second LL SP 310. This is why the third frame 373 can only be partially transmitted.

When addressing low latency traffic (e.g. in case of HMD scenario, wherein the time domain, a sufficient sampling rate as well as low measurement latency and jitter are of prime importance for human behavior and physiology), the aging of such frame can be relatively short. This typically means that an erroneously transmitted LL frame can be useless re-transmitted later because inappropriate for such applications due to their QoS constraints. This by consequence also means that a LL frame that could not be delivered on time can be considered as lost with regards to the next transmission opportunity.

Therefore, the remaining frame 373 is deleted at time T7 before the next TWT medium access T8.

The present illustration provides that RU are not filled accurately (either too padding, or still LL data cannot be transmitted).

When the real-time traffic is non-periodic and with non-anticipated time arrival, scheduling (as TWT) becomes non-efficient as many of the allocations might not being used by the allocated STA. TSPEC-like technics of the art are mainly based on mean rate assumptions, this is not live information and as such not adapted to aperiodic latency sensitive traffic. Current BSR-like technics of the art only provides amount of buffered traffic (status), which does not tell critical timing requirement in live.

For latency sensitive and periodic UL traffic, latency is especially not guaranteed for fluctuant traffic.

The present invention seeks to improve the usage (scheduling) of the wireless resources for multi-user transmission, particularly for non-deterministic traffic (non-deterministic traffic could be: fluctuating traffic such as VBR, or aperiodic traffic (where TSPEC is not consistent), traffic where allocation is based on mean data rate and peak rate is difficult to address, . . . ). The problem is notably exacerbated when traffic shall follow a low-latency or real-time requirement. To do so, an aim of this invention is to provide more reliable data reports from an 802.11 station to the 802.11 access point, as a countermeasure to the raised issues.

The invention provides a solution for a station to inform the AP about its real and instant needs for sending low latency and fluctuating traffic. The invention relates to a method for providing, in a frame sent to an AP, a BSR reporting an amount of buffered data at the STA for the AP to schedule resources; wherein the station further provides to the AP a time limit, associated with an amount of data reported in the BSR, for the STA to transmit the data in a resource scheduled by the AP.

An exemplary wireless network for the implementation of embodiments of the invention is an IEEE 802.11be network or one of its future versions. The invention is especially suitable for low-latency data transmission in resource units of an IEEE 802.11 be network and its future versions.

Embodiments of the invention generally apply to any station, non-AP or AP, for which resources are to be scheduled by a scheduling station (e.g. AP). The station (which may also be referred to as a scheduled station) may then provide information about its traffic needs and timing constraints to the scheduling station according to embodiments of the invention.

For example, in the case of P2P links established between stations of a P2P group of stations, a coordinator station (e.g. Group Owner), acting as a scheduling station for the P2P group, has to know the real-time information of other stations of the group.

Another example may concern a Multi-AP transmission (defined above). A first coordinated AP may be responsible of scheduling resources that are to be shared with a second coordinated AP. Here, the first AP may act as the scheduling station and the second AP as the scheduled station.

Figures 4A, 4B:
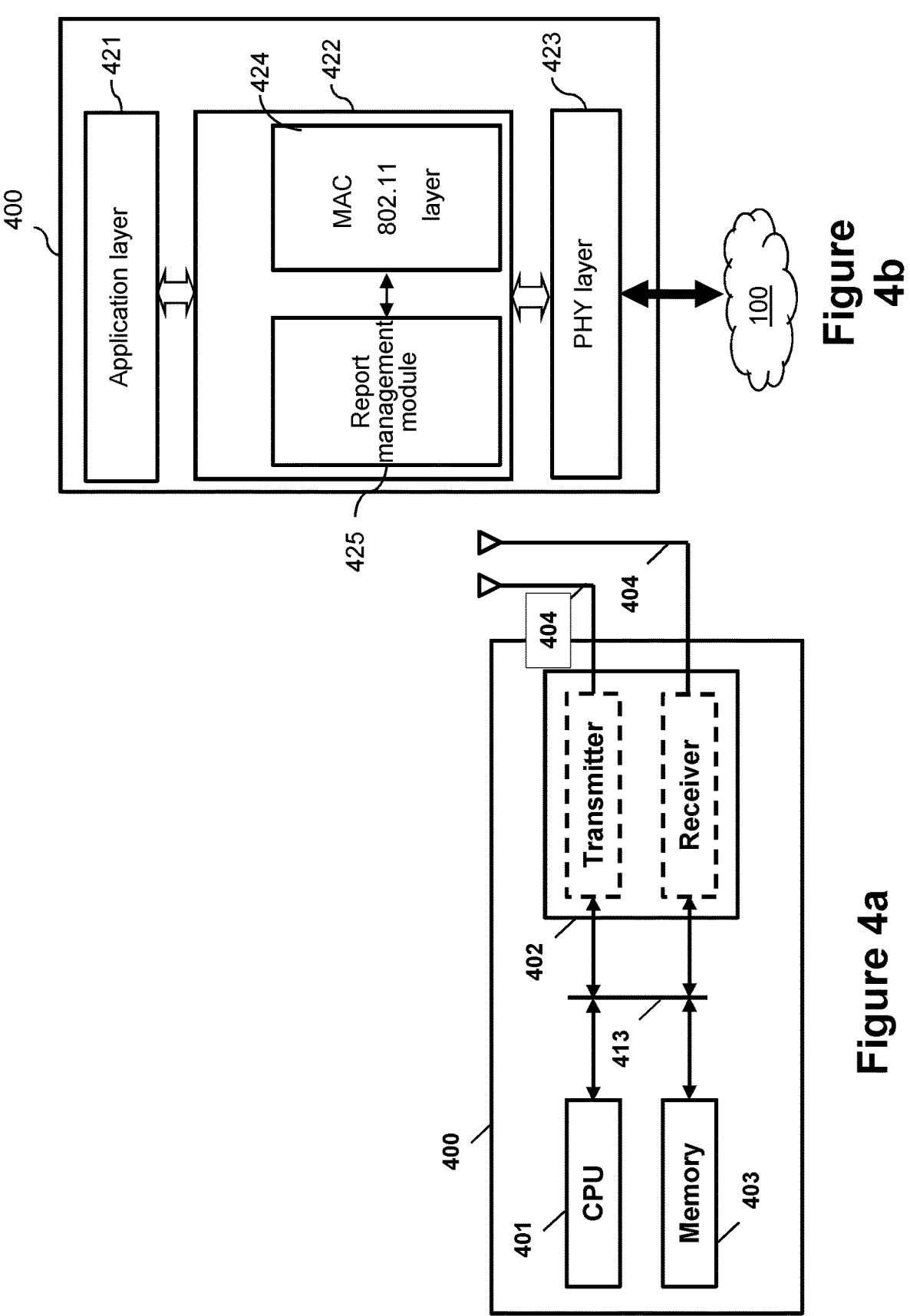
FIGS. 4A and 4B illustrate an example of hardware and software general architecture of a station.

FIG. 4A schematically illustrates a communication device 400, either a non-AP station 101-107 or the access point 110, of the radio network 100, configured to implement at least one embodiment of the present invention. The communication device 400 may preferably be a device such as a micro-computer, a workstation or a light portable device. The communication device 400 comprises a communication bus 413 to which there are preferably connected:

a central processing unit 401, such as a processor, denoted CPU;

a memory 403 for storing an executable code of methods or steps of the methods according to embodiments of the invention as well as the registers adapted to record variables and parameters necessary for implementing the methods; and at least one communication interface 402 connected to a wireless communication network, for example a communication network according to one of the IEEE 802.11 family of standards, via transmitting and receiving antennas 404.

Preferably the communication bus provides communication and interoperability between the various elements included in the communication device 400 or connected to it. The representation of the bus is not limiting and in particular the central processing unit is operable to communicate instructions to any element of the communication device 400 directly or by means of another element of the communication device 400.

The executable code may be stored in a memory that may either be read only, a hard disk or on a removable digital medium such as for example a disk. According to an optional variant, the executable code of the programs can be received by means of the communication network, via the interface 402, in order to be stored in the memory of the communication device 400 before being executed.

In an embodiment, the device is a programmable apparatus which uses software to implement embodiments of the invention. However, alternatively, embodiments of the present invention may be implemented, totally or in partially, in hardware (for example, in the form of an Application Specific Integrated Circuit or ASIC).

FIG. 4B is a block diagram schematically illustrating the architecture of the communication device 400, either the AP 110 or one of stations 101-107, adapted to carry out, at least partially, the invention. As illustrated, device 400 comprises a physical (PHY) layer block 423, a MAC layer block 422, and an application layer block 421.

The PHY layer block 423 (here typically an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 330 to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 422 preferably comprises an 802.11 MAC layer 424 implementing conventional 802.11ax/be MAC operations, and additional block 425 for carrying out, at least partially, embodiments of the invention. The MAC layer block 422 may optionally be implemented in software, which software is loaded into RAM 403 and executed by CPU 401.

Preferably, the additional block 425, referred to as Report management module, implements the part of embodiments of the invention (either from station perspective or from AP perspective). This block performs the operations of FIGS. 7 and/or 8, depending on the role of the communication device 400.

802.11 MAC layer 424, Report management module 425 interact one with the other in order to process accurately communications over OFDMA RU addressed to multiple stations according to embodiments of the invention.

On top of the Figure, application layer block 421 runs an application that generates and receives data packets, for example data packets such as a video stream.

Application layer block 421 represents all the stack layers above MAC layer according to ISO standardization.

Embodiments of the present invention are now illustrated through a new format of report for low-latency traffics as illustrated by FIG. 5.

Figures 6A, 6B:
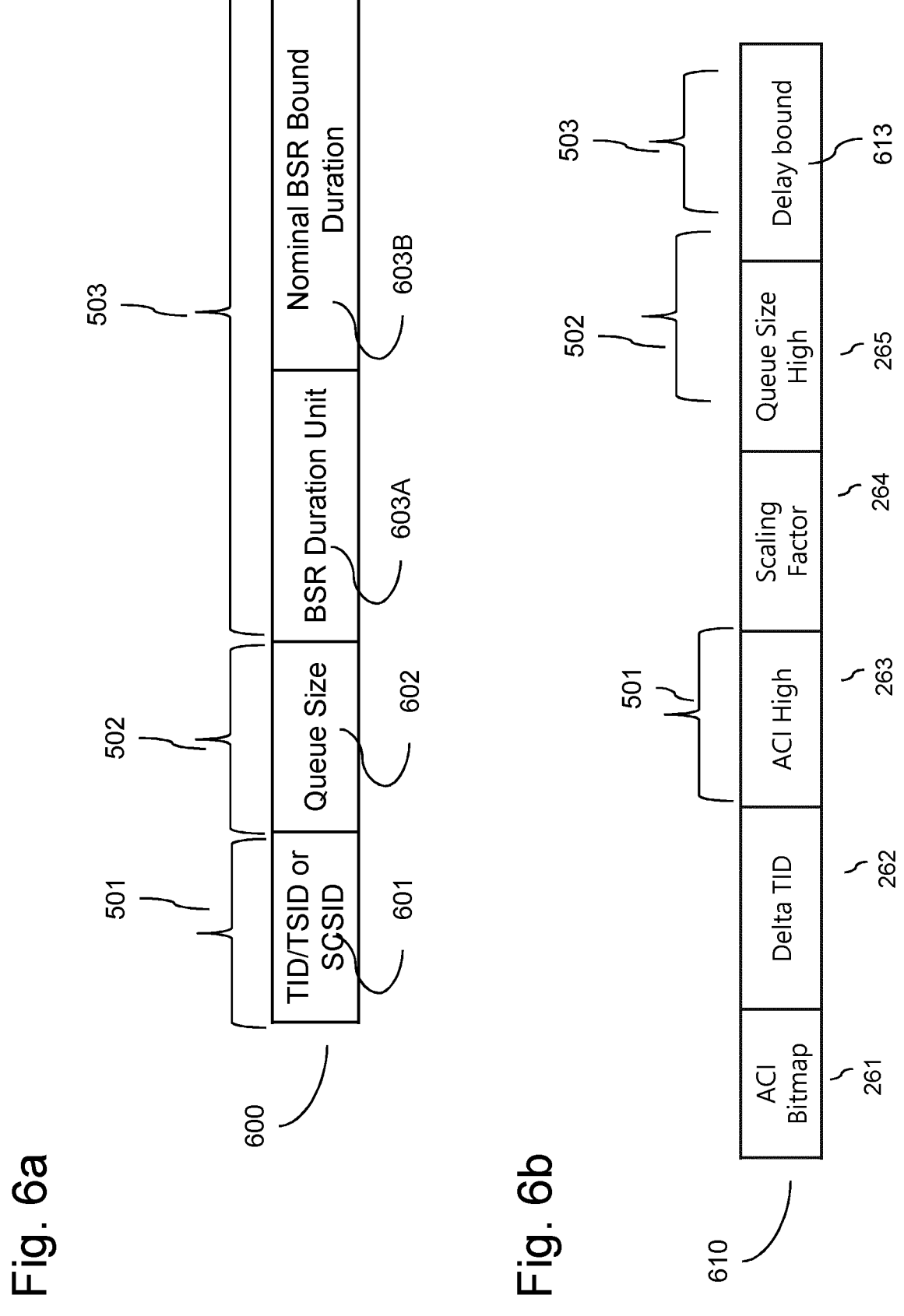
FIGS. 6A, 6B, and 6C illustrate a report according to different embodiments of the invention.
Figure 6C:
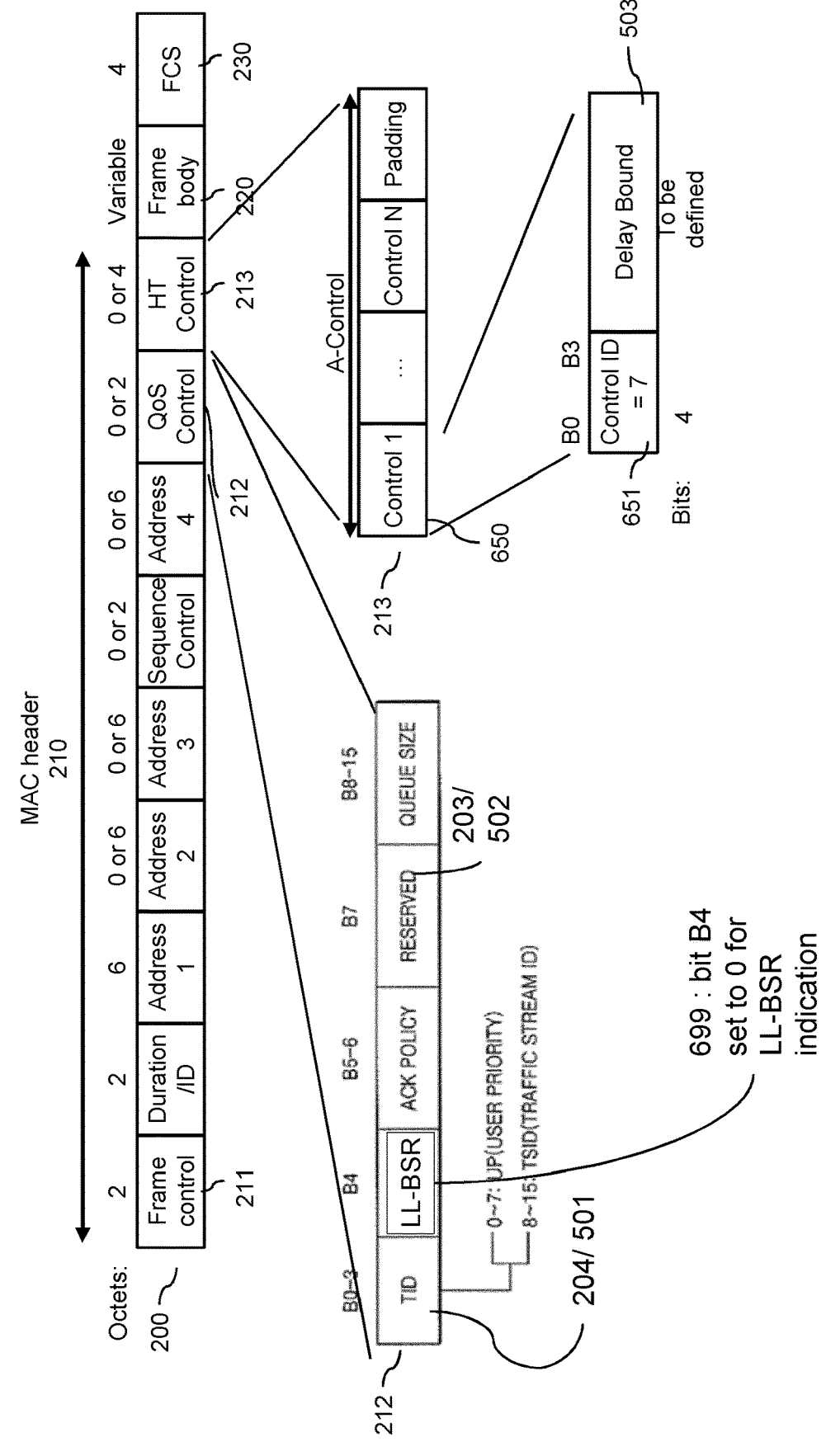

This format 500 aims to be generic, in the sense it could be declined in a new independent format, as illustrated by FIG. 6A, or part of the format can be added to various existing types of reports, like for example legacy buffer status as illustrated by FIG. 6C, 802.11ax buffer status as illustrated by FIG. 6B, or any combination of those.

Preferably, at least part of the report 500 is to be conveyed through the A-Control subfield 213. For instance, it may be indicated in Control Information subfield 252 when Control ID takes the value 7, values 8 up to 15 remaining reserved.

The report 500 will be named as Low-latency Buffer Status report (LL-BSR) and its usage is indicated through new entry 599 in the Control ID table for A-Control fields.

Aim is for a STA to provide a BSR indication linked with a related aging information, which can be seen as a validity duration for the reported amount of data. In other words, it includes an amount of data, linked with a boundary timing, which results in an indication of said amount of data to be delivered under said given delay.

It shall be noted that the boundary timing indication is different from any aging function indicated by the higher layer application for MSDU discard within the MAC, such as due to the operation of a per-TS MSDU lifetime. Indeed, per-TS MSDU lifetime represents an average need for a traffic, where all MSDUs share the same expected delivery time. The timing indication is a time indication representative of a time limit for the transmission of the buffered data reported in the LL-BSR.

Differently, the boundary delay of a LL-BSR relates to the instant requirement of communication delivery at MAC layer, information that is fluctuating in timing and amount of data according to the past transmissions, in case of lost medium attempts, fluctuation of local incoming buffered traffic, etc., and the expected next transmissions (e.g. next negotiated TWT service period).

In complement, the LL-BSR has to be dynamic, in the sense that (LL and non-LL) flows can be added or deleted at any time, without affecting the guarantees already given to other flows.

The LL-BSR 500 is composed of a Traffic Id subfield 501, an amount of data subfield 502, and a Delay Bound 503.

The first field 501 identifies the Traffic session for which the LL-BSR is issued. Depending on the low-latency service negotiated between the AP and the non-AP station generating the report, it may appear that the traffic indication can support two forms: per-class report and per-flow report.

With per-class report, the traffic flows that have the same class share the same queue that is considered in the report: an AC value indicative of an Access Category, a TID indicative of a Type of Traffic (aka User priority).

With per-flow report, a specific high layer traffic is admitted as resource reservation by the AP in its BSS, and an identifier of a traffic flow is used by a station to request its creation, modification, or deletion. As example, identifier could be a TSID indicative of a parameterized traffic, a SCSID according to Stream Classification Service (SCS) of 802.11aa.

In other embodiment, the identifier can be TWT Flow Identifier as the low-latency traffic flow follows a TWT service period.

If the LL-BSR is a report for a P2P traffic, the AID of the receiving peer station can be used. Alternatively, a session identifier corresponding to the direct link session (e.g. identifier of the established direct link) can be used for 501. This can be envisaged when the AP has allowed the P2P session (like for DLS protocol) and has granted an identifier for this session. In a preferred approach, the session identifier lies in an AID format of 12 bits. It is up to the AP to allocate distinct values compared to AID of stations.

Amount of data 502 lies to the count of buffered data units that are relevant for the present buffer reporting.

The delay bound is a current "live" information for the AP, which provides simplicity and efficiency for scheduling next communication slots. It shall be noted that neither the former EDCA nor the recent MU UL OFDMA can guarantee any throughput or delay bounds, but only performance differentiation among the categories.

As a result, the LL-BSR aims to propose a means for transmitter STA to inform the scheduling station for achieving zero congestion loss (objective is all data delivered on time).

While the LL-BSR is described with regards to traffic flows that are low latency, it is not limited to application to one single traffic. As a station may embed several multimedia traffics, each having widely varying characteristics, then the station may have different delay bounds upon time. Individually managing traffics is burden. Therefore, the LL-BSR simplifies the scheduling at AP, by informing it of an instantaneous global need until a boundary time (e.g. use of per-class report format and no longer per-flow, such per-class reporting considering several flows). In a more extreme way, usage of such LL-BSR report may also simplify the TWT SPs negotiation by not requiring a detailed traffic specification (e.g. only mean data rate information can be used): the scheduled station may regularly inform by LL-BSR the adapted needs with regards to next Service Period(s) boundaries.

One may note that the usage of LL-BSR format can be broaden to numerous implementation specific algorithms for network resource allocation.

FIG. 6A illustrates an embodiment for the LL-BSR 500.

The LL-BSR contains also traffic identifier subfield (601), queue size (602) corresponding respectively to subfields 501 and 502.

The ID subfield 601 identifies the Traffic class (TID) or Traffic Stream (TSID, SCSID) to which the corresponding buffer status belongs. As example, this subfield may be 8-bit long:

values 0-7 are set for identifying a User Priority for either TC or TS.

Values 8-15 are set for identifying a TSID.

Values 16-31 are set for identifying a SCSID (wherein the SCID value is determined by bit-masking with 0xF).

Values 32-47 are set for identifying TWT Flow Identifier in the case that the low-latency traffic flow follows a TWT service period (wherein the TWT Flow ID value is determined by bit-masking with 0xF).

The BSR Duration Unit subfield (603A) indicates the unit of the Nominal BSR Bound Duration subfield. The BSR Duration Unit subfield is set to 0 if the unit is 256 µs and is set to 1 if the unit is a time unit (TU), where one TU corresponds to 1024 µs. Additionally, value is set to 2 if the unit is expressed in multiple of TBTT (target beacon transmission time, indicated in beacon frame of the BSS). Another case could be a value 3 expressed in terms of TWT Wake Interval as negotiated in between the TWT STA and the TWT AP. These examples are not limitative.

The Nominal BSR Bound Duration subfield (603B) indicates the maximum amount of time, in the units indicated by the BSR Duration Unit subfield, that the STA is expected to elapse from the transmission of the frame including the BSR until the next triggering frame, in order to complete transmission of buffered data specified in Queue Size subfield for the identified Traffic.

FIG. 6B presents an alternative embodiment, wherein the LL-BSR is based on BSR Control according to 802.11ax.

The buffer status reported in the LL-BSR Control field consists of a high priority AC, one queue size and one Delay Bound.

According to 802.11ax standard, the ACI Bitmap subfield 261 indicates the access categories for which the buffer status is reported, namely the Queue Size All 266.

Embodiment may consist in no longer reporting the Queue Size All 266, but instead using the location the Queue Size All subfield for a Delay Bound subfield 613. A specific number of bits in the ACI Bitmap subfield set to 0 may indicate the LL-BSR.

As a result, if the ACI Bitmap subfield is 0 and the Delta TID subfield is different from 3 (because this value is already used in 802.11ax in this context of ACI Bitmap set to 0), then the buffer status is a LL-BSR.

Preferably, Delta TID subfield is set to 0 as this value is not applicable for 802.11 ax.

Next subfields are used for the LL-BSR report.

The ACI High subfield indicates the ACI of the AC for which the LL-BSR is indicated in the Queue Size High subfield.

Still, the Scaling Factor subfield indicates the unit SF, in octets, of the Queue Size High subfield.

The Queue Size High subfield indicates the amount of buffered traffic, in units of SF octets, for the AC identified by the ACI High subfield that is intended for the STA identified by the receiver address of the frame containing the LL-BSR Control subfield.

The 'Delay Bound' subfield is 1 octet in length and indicates the Delay Bound in TUs, rounded down to the nearest TU, for the amount of buffered traffic to be transmitted as specified by Queue Size High subfield. The STA identified by the receiver address of the frame containing the LL-BSR Control subfield (e.g. AP) is expected to schedule frames buffered at station emitting the LL-BSR for delivery within the time period specified by this Delay Bound subfield.

FIG. 6C presents an alternative embodiment, wherein the LL-BSR is based on QoS Control.

The buffer status reported in the QoS Control field consists of a queue size value for a given TID.

A scheduled station according to embodiments of the invention may report the queue size for a given TID in the Queue Size subfield of the QoS Control field in QoS Data or QoS Null frames it transmits. The station may set the B4 (LL-BSR indication bit 699) to 0 to indicate that the BSR is an LL-BSR, while the Delay Bound information is present in a Delay Bound subfield 503 of a LL-BSR Control subfield 651. The size in bits of the subfield 503 may be chosen to an appropriate number.

For a reported BSR having a B4 set to 0, there shall have at most one LL-BSR subfield present.

The STA may aggregate multiple QoS Data frames or QoS Null frames in an A-MPDU to report the queue size and delay bound for different TIDs.

Even if the present illustration is performed based on a legacy QoS Control (212) followed by a Control subfield 650 representative of a Delay Bound (503) which together form a LL-BSR according to embodiments, one may understand that this is non-limitative. For example, the same principle may be applied for 802.11ax BSR formats: a QoS frame having a Control subfield 650 representative of BSR control field 260 can be followed by a subsequent QoS frame embedding a Control subfield 650 representative of a Delay Bound (503), which together form a LL-BSR according to a variant.

Advantage of these embodiments (alternative embodiment of FIG. 6C and the described variants) is to reuse existing BSR formats and/or codes, and to ensure backward compatibility.

Figure 7:
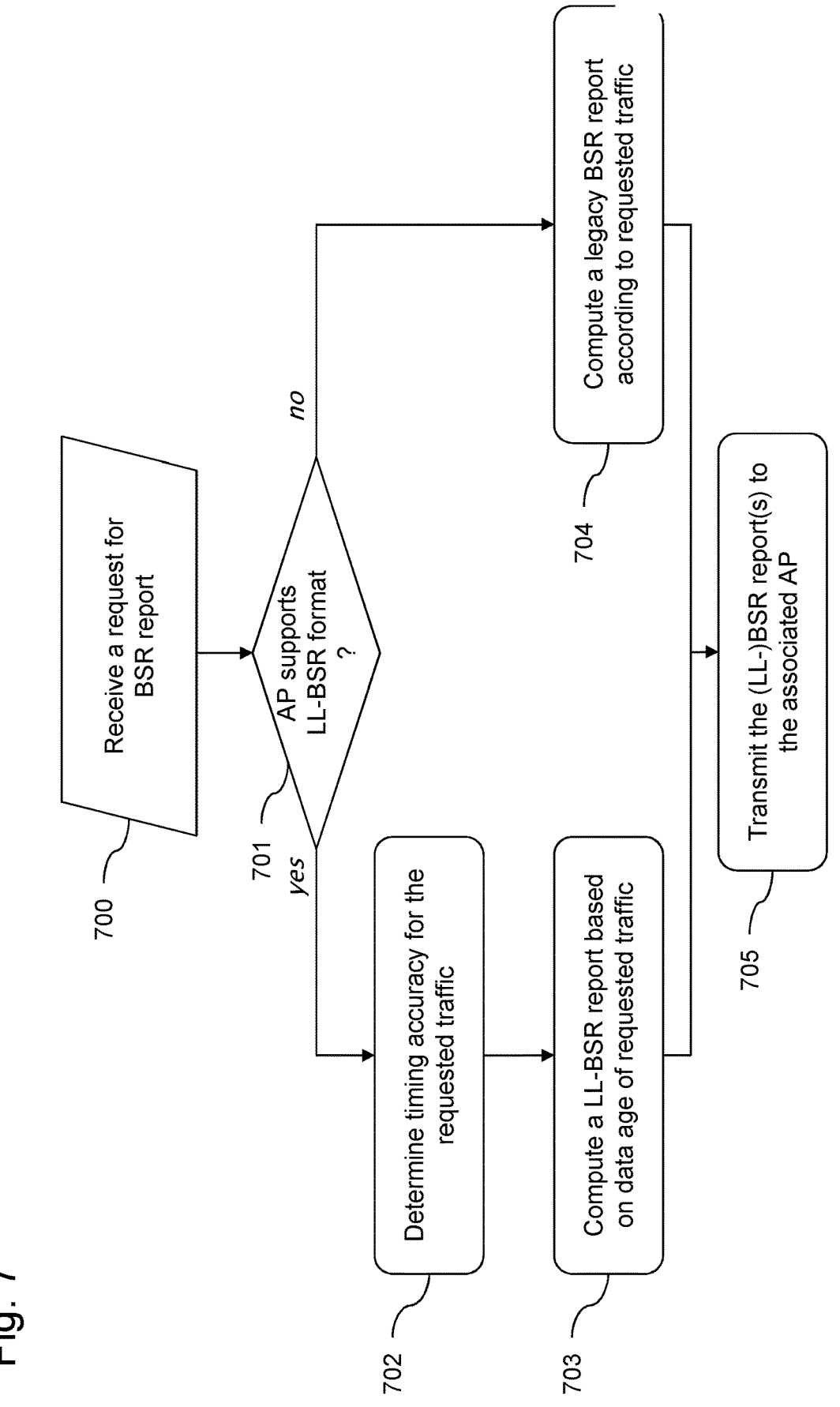
FIG. 7 illustrates, using a flowchart, embodiments of the invention implemented at a scheduled station.

FIG. 7 illustrates, using a flowchart, embodiments of the invention implemented at a scheduled station 400 to generate low-latency data reports (LL-BSR) according to embodiments of the invention.

A scheduled station delivers low-latency buffer status reports (LL-BSRs) to assist its scheduling station (e.g. AP) in allocating UL (and/or P2P) MU resources for low latency data. The scheduled station can either implicitly deliver LL-BSRs in the LL-BSR Control subfield of any frame transmitted to the AP (unsolicited LL-BSR) or explicitly deliver LL-BSRs in any frame sent to the AP in response to a LL-BSRP (LL-BSR Poll) Trigger frame (solicited LL-BSR).

A LL-BSRP Trigger frame is a trigger variant with a new dedicated Trigger type (e.g. Trigger Type subfield value in the range 8-15 currently unused by 802.11ax specification).

An 802.11be/EHT station (AP and non-AP) according to embodiments of the invention may set a LL-BSR Support subfield in the EHT Capabilities element it transmits to 1; otherwise the station may set the LL-BSR Support subfield to 0.

Note that an AP according to embodiments of the invention may transmit a LL-BSRP Trigger frame that contains one or more RUs for random access.

A station reports its buffer status (unsolicited LL-BSR) to the AP with which it is associated in QoS Null and QoS Data frames, but also in response to a LL-BSRP trigger frame (solicited LL-BSR).

Step 700 consists in the requirement to emit a LL-BSR (both solicited and non-solicited).

Test 701 consists for the station to determine if the recipient would understand the LL-BSR. The result is always positive for a solicited LL-BSR. For unsolicited report, the STA may verify if the AP has indicated its support in the LL-BSR Support subfield of its EHT Capabilities element (information obtained upon association procedure). In negative case, the process ends by transmitting a legacy BSR (not LL-BSR) in step 704.

During steps 702 and 703, the station may determine if buffered data units are growing in its buffer (both in term of aging or in quantity), which would result in data drop if no action is performed. Step 702 focuses on determining an interval suitable for reporting for a given flow.

As example, with regards to low latency delivery of real time flows, the station may want to inform of an immediate buffer queuing situation. The delay bound may be preferably considered according to the negotiated service period of the concerned flow with the AP (SP can be expressed in Time Units, TBTT, TWT wake intervals etc.). Any implementation-specific scheduling algorithm may be envisaged and is beyond the scope of this invention.

Step 703 complements the previous step 702 by quantifying the buffered data with regards to the determined interval or Delay bound.

Note that a Delay Bound set to a zero value may indicate the current buffer status, which is equivalent of the legacy BSR. This could be used by the station is case the traffic flow situation is normal.

The station may set the Queue Size subfield in the LL-BSR to a zero value if it indicates that no other scheduling is needed for the period of time indicated by the Delay Bound.

In other embodiments, the station may set the Queue Size subfield in the LL-BSR to a negative value to indicate that the average rate scheduled by the scheduling station needs to be reduced, e.g. by diminishing the provisioned data amount for the periodicity as indicated by delay bound. This aims to adapt the initial RU allocation through the first trigger frame of a service period.

Step 705 transmits the LL-BSR according any format presented through FIGS. 5 and 6A-6C.

As already described, the station may aggregate several LL-BSRs (practically, one LL-BSR per aggregated QoS_Null frame) in order to report for several flows. In that case, the steps 701-702-703 are repeated accordingly for each flow to be reported.

Figure 8:
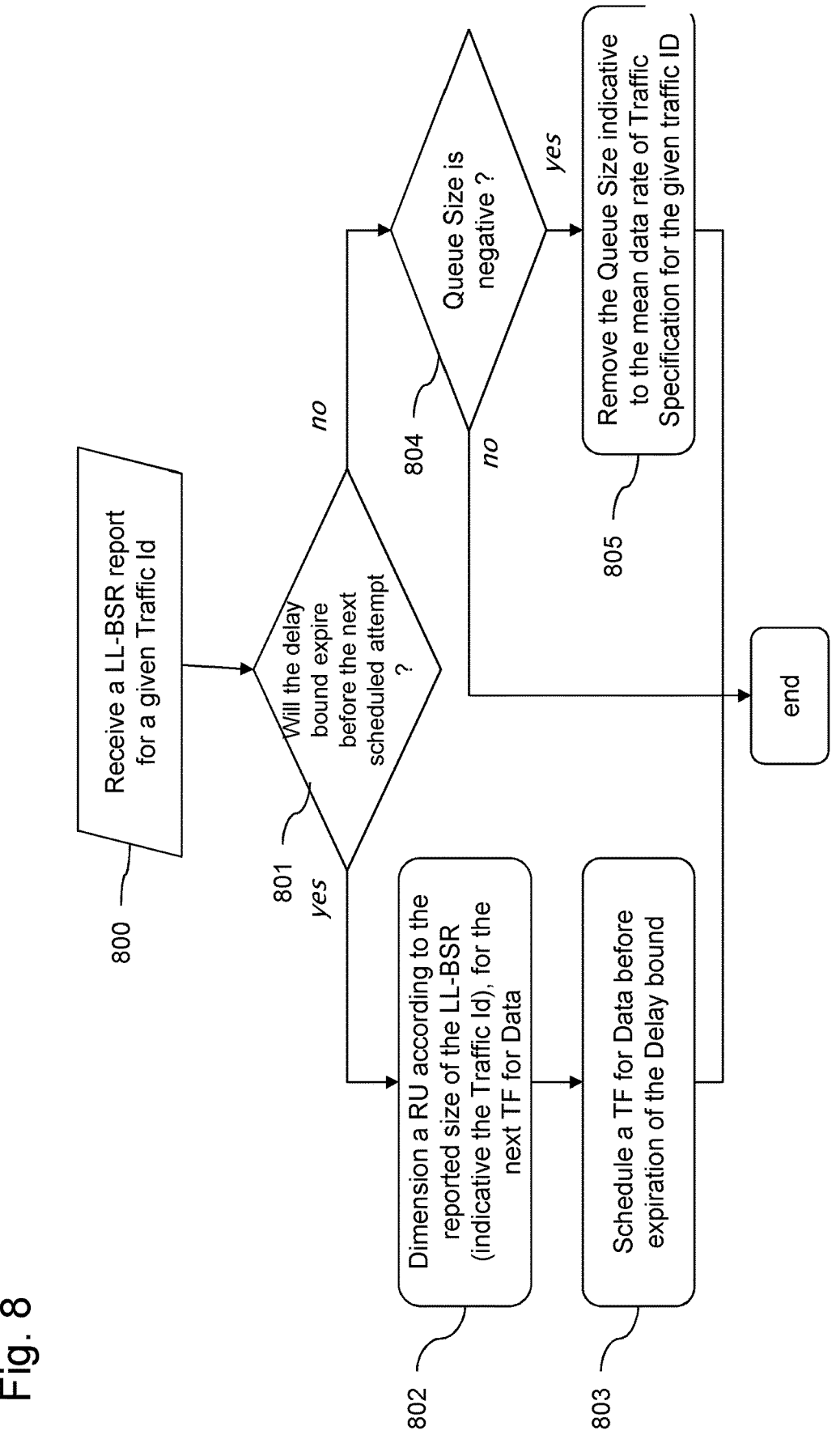
FIG. 8 illustrates, using a flowchart, embodiments of the invention implemented at a scheduling station.

FIG. 8 illustrates, using a flowchart, embodiments of the invention implemented at a scheduling station (AP) 400 when it receives low-latency data reports (LL-BSR) according to embodiments of the invention.

The flowchart is a simple and non-limitative illustration of one usage of a received LL-BSR, any further adaptation or specific usage could be envisaged. The concept of LL-BSR 500 is flexible enough for any implementation-specific scheduling algorithm.

The AP receives (step 800) a LL-BSR report from a station 400 and for a given traffic flow. As already disclosed, the report could be per-class or per-flow, and could have been solicited or not.

As the LL-BSR is self-contained, the Traffic identification is easy so that the AP can measure the remaining time before a next service period for the considered traffic. For example, a TWT scheduling AP uses a TWT Flow Identifier of the LL-BSR that identifies an existing TWT agreement in order to determine the next TWT SP start time for that TWT agreement.

As the result of comparison of the indicated Delay Bound against any Service Period occurrence, the test 801 conducts to step 802.

The direct impact of the LL-BSR indication is applied to the next scheduled provision before the next SP. In preferred embodiment as further illustrated in FIG. 9, the RU allocation is performed in a same granted TXOP that the one used to receive the present LL-BSR.

The update of next allocation is not limitative to the provided example. Any further medium allocation by the AP may be considered to fulfill the expectation of the station (e.g. a distinct SU communication initiated by the AP, a further MU scheduling in case the AP has not enough time to adapt the RU allocation for all stations of the present MU communication having each sent their own LL-BSR, etc.).

At step 803, the AP uses the timing information associated with the BSR to adapt its scheduling (move the scheduling forward/backward, increase/decrease the resource size). For scheduling adaptation that requires changes on occurrences of the TWT SPs, the AP may deliver as response to the frame transmitting the LL-BSR a frame indicative of an update of TWT scheduling. Otherwise, the scheduling of TWT SPs remains, but resource allocation inside a SP is adapted.

If the delay Bound has no meaning regarding the next Service Period (test 801 is false), it may have meaning for long term scheduling. One example may be an indication delay based on TBTT value (e.g. 10 times the value of a TWT SP).

As example, a further test 804 could be performed in order to determine if the station wants to inform of a reduction of the average allocation. This could be typically the case of having a Queue Size indication as negative in the LL-BSR.

The AP thus considers that this indication has to be applied on the mean rate specification of the Traffic flow, and adapts definitely (at least until further notice with another LL-BSR of that kind) its scheduling accordingly.

Figure 9:
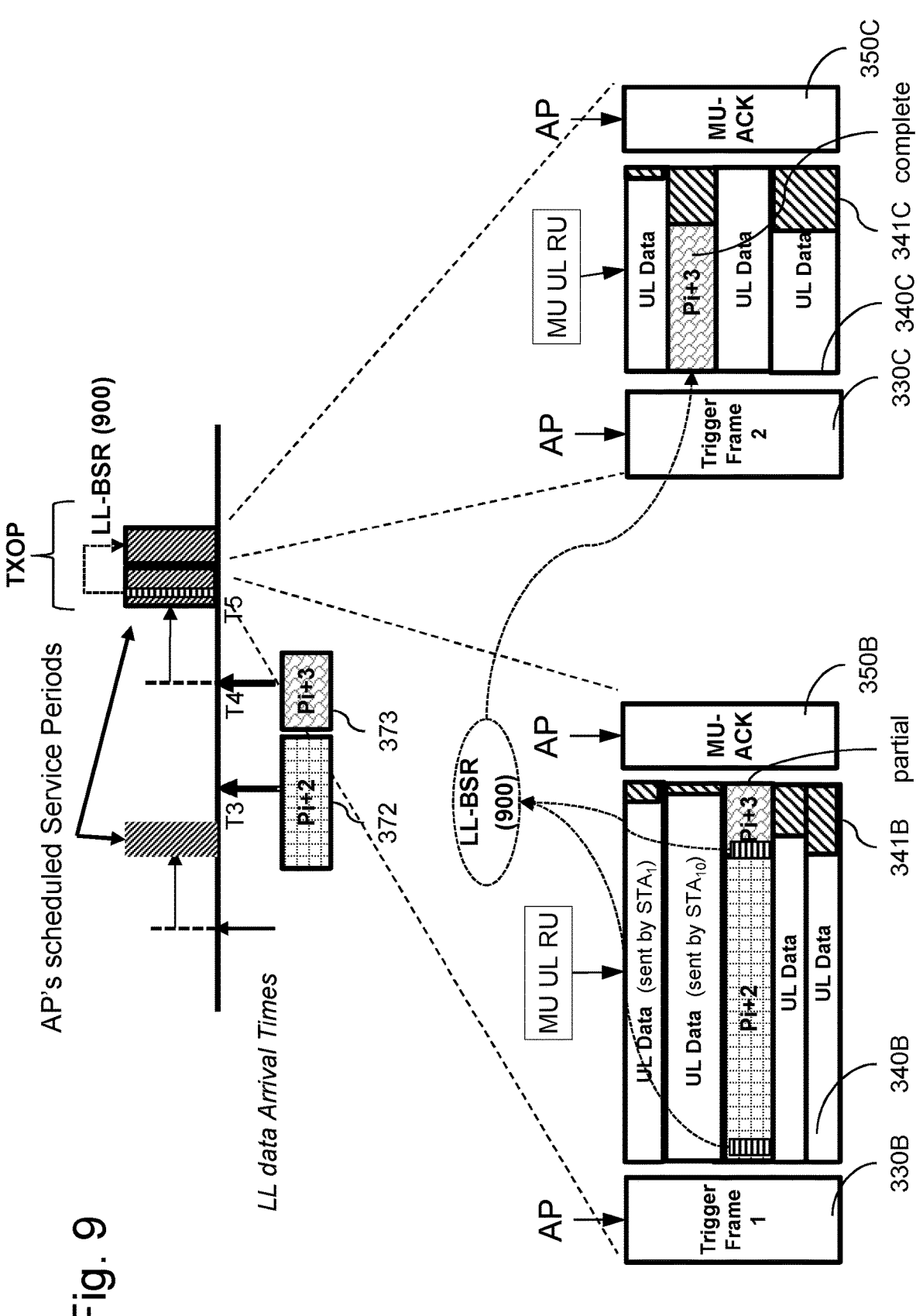
FIG. 9 illustrates advantages of the LL-BSR according to embodiments of the invention.

FIG. 9 provides illustration of advantages of the LL-BSR according to embodiments of the invention, in the context of timeline of FIG. 3.

Typically, the AP sends a same TF in the Service Period starting at date T5.

An LL-BSR (identified as 900 in the figure) that is included in any MAC frame of a MU PPDU can be used by the AP to provide a supplementary MU allocation within the same TXOP.

For the first MU communication 340B, any of the MSDU Pi+2 or Pi+3 can contain a LL-BSR in its MAC header. This is useful for indicating a subsequent MU communication 340C for this traffic flow of same station. As now becoming apparent, the MSDU Pi+3 can be completely transmitted through the second RU allocation provided by TF2.

Optionally, the LL-BSR is not included in the Pi+2 nor Pi+3; in that case, the Pi+3 is not transmitted inside 340B but is replaced by a QoS_Null Data frame that contains the LL-BSR 900. This possibility provides the advantage of not fragmenting the Pi+3 frame.

As a result, the MSDU frame Pi+3 is delivered on time and not lost as would occur with prior-art means.

One may note that the second MU communication triggered by TF2 may be shorter than the one originally triggered by TF1 based on Traffic Specifications. The number of triggered stations can also be different (typically less), and allocation may span larger RUs for those stations.

One may note that the usage of LL-BSR according to embodiments of the invention support a more conservative allocation by AP scheduler: TSPEC specifies minimal requirement of resources for the station that minimizes the padding, and when a peak of data is to be transmitted, the station notifies those delta data with a notification 900 including timing information and required amount of data.

The usage of LL-BSR according to this invention aims to respond to drawbacks of using TSPEC as unique scheduling means by the AP. As TSPEC does not provide real-time information but expectations, the AP is not capable of maintaining a fine tuning of its scheduling (TSPEC could serve only as max/min limits).

By adopting a live reporting by stations 400 according to embodiments of the invention, the resource unit allocation is more efficient for fluctuant traffic. The allocation of wireless resources by the access point is performed in regards to the real needs of scheduled stations for real-time traffic flows.

According to another aspect of the invention, there is provided a method for updating the traffic specification of a traffic admitted by a scheduling station (e.g. a traffic of a station that is scheduled by the AP, the station being associated with the AP). FIG. 10 illustrates, using a flowchart, embodiments of the invention according to this other aspect.

Report 500 may be used in this embodiment. It may be named as Low-latency Buffer Status report (LL-BSR) but its new usage indicated through a new entry 599 in the Control ID table for A-Control fields. For example, value '8' can be used to indicate that the new format is used to modify the existing specification of the identified traffic.

A step 1000 is executed when such a LL-BSR for TSPEC update is received and determined as such type.

A test 1001 consists in determining if the value of Amount of Data/Queue size 502 is positive or negative for the identified traffic flow. Such determination could be performed by checking the MSB bit of the Queue Size field 502, wherein the MSB bit set to 1 indicates a negative value. In other words, the Queue Size field follows a signed notation such as two's complement representation (the first bit tells about the sign).

For the positive case (step 1002), the Traffic Specification is updated with a positive amount based on the amount of data 502 and the duration 503 as specified by the BSR. Typically, a mean data rate for the traffic specification of the identified Traffic is increased by a delta data rate computed by averaging the amount of data 502 over the duration 503.

Reciprocally, for the negative case (step 1003), the Traffic Specification is updated with a negative amount based on the amount of data 502 and the duration 503 as specified by the BSR. Typically, a mean data rate for the traffic specification of the identified Traffic is decreased by a delta data rate computed by averaging the amount of data 502 over the duration 503.

This adaptation of Traffic Specification may be definitive, until further notice by a subsequent LL-BSR reception.

The usage of LL-BSR according to this alternative embodiment of the invention aims to respond to drawbacks of using TSPEC as unique scheduling means by the AP.

As TSPEC does not provide real-time information but expectations, the AP is not capable of maintaining a fine tuning of its scheduling (TSPEC could serve only as max/min limits).

The LL-BSR of present alternative is able to seamlessly (no specific management frame nor re-negotiation) adapt the traffic specification and by consequence the scheduling of the AP.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a wireless communication network, wherein the method comprises at a station:

sending to an access point station a frame comprising a buffer status report reporting an amount of buffered data to be transmitted;

receiving, from the access point station, an allocation of a resource unit for the transmission of the buffered data; and transmitting the buffered data in the allocated resource unit;

wherein the frame sent to the access point station further comprises a time indication for the transmission of the buffered data by the station, wherein the buffer status report comprises:

an identifier indication identifying a type of the buffered data; and a buffer status report duration unit indication identifying a time unit used to express the time indication; and wherein, if the amount of the buffered data is not zero, the time indication is representative of a time limit for the transmission of the buffered data by the station and wherein the resource unit is allocated prior to the time limit.

2. The method of claim 1, wherein the resource unit is a Multi-User resource unit allocated within a transmission opportunity reserved by the access point station.

3. The method of claim 2, wherein the Multi-User resource unit is an uplink resource unit for transmitting buffered data to the access point station.

4. The method of claim 2, wherein the Multi-User resource unit is a direct link resource unit for transmitting buffered data to a station.

5. The method of claim 2, wherein the frame comprising the buffer status report is sent within the same transmission opportunity comprising the allocated resource unit.

6. The method of claim 1, wherein the buffered data is transmitted to a non-access point station associated with the access point station.

7. The method of claim 1, wherein the buffered data is transmitted to another access point station through a Multiaccess point transmission.

8. The method of claim 1, wherein the identifier indication identifies a class of buffered data.

9. The method of claim 1, wherein the identifier indication identifies a flow of buffered data.

10. The method of claim 1, wherein the buffer status report comprises:

an access category indication identifying the access category corresponding to the buffered data; and a data unit indication identifying a data unit used to express the amount of the buffered data.

11. The method of claim 1, wherein the buffer status report is included in a quality of service or high throughput control field of an 802.11 MAC Data frame.

12. A non-transitory computer-readable storage medium storing instructions of a computer program for implementing a method according to claim 1.

13. The method of claim 1, wherein the time indication is representative of a time limit for the transmission of the buffered data by the station.

14. The method of claim 1, wherein the time indication is aging information representative of a validity duration of the buffered data.

15. A communication method in a wireless communication network, wherein the method comprises at an access point station:

receiving, in a frame sent by a station, a buffer status report reporting an amount of buffered data to be transmitted by the station; and transmitting to the station an allocation of a resource unit for the transmission of the buffered data;

wherein the frame sent by the station, and comprising the buffer status report, further comprises a time indication, wherein the resource unit is allocated based on the received time indication, wherein the buffer status report comprises:

an identifier indication identifying a type of the buffered data;

a buffer status report duration unit indication identifying a time unit used to express the time indication; and wherein, if the amount of the buffered data is not zero, the time indication is representative of a time limit for the transmission of the buffered data by the station and wherein the resource unit is allocated prior to the time limit.

16. The method of claim 15, wherein, if the amount of the buffered data is zero, the time indication is representative of a time limit until which an allocation of resource unit is not needed by the station.

17. The method of claim 15, wherein, if the amount of the buffered data is not zero, the time indication is aging information representative of a validity duration of the buffered data and wherein the resource unit is allocated prior to the expiry of the validity duration.

18. A station in a wireless communication network, wherein the station comprises a processor configured for:

sending to an access point station a frame comprising a buffer status report reporting an amount of buffered data to be transmitted;

receiving, from the access point station, an allocation of a resource unit for the transmission of the buffered data; and transmitting the buffered data in the allocated resource unit;

wherein the frame sent to the access point station further comprises a time indication for the transmission of the buffered data by the station, wherein the buffer status report comprises:

an identifier indication identifying a type of the buffered data; and a buffer status report duration unit indication identifying a time unit used to express the time indication; and wherein, if the amount of the buffered data is not zero, the time indication is representative of a time limit for the transmission of the buffered data by the station and wherein the resource unit is allocated prior to the time limit.

19. An access point station in a wireless communication network, wherein the access point station comprises a processor configured for:

receiving, in a frame sent by a station, a buffer status report reporting an amount of buffered data to be transmitted by the station; and transmitting to the station an allocation of a resource unit for the transmission of the buffered data;

wherein the frame sent by the station, and comprising the buffer status report, further comprises a time indication, wherein the resource unit is allocated based on the received time indication, wherein the buffer status report comprises:

an identifier indication identifying a type of the buffered data;

a buffer status report duration unit indication identifying a time unit used to express the time indication; and wherein, if the amount of the buffered data is not zero, the time indication is representative of a time limit for the transmission of the buffered data by the station and wherein the resource unit is allocated prior to the time limit.

20. A method comprising generating and sending a frame designed to be sent by a station of a wireless communication network to an access point station, the frame comprising a buffer status report field reporting an amount of buffered data to be transmitted by the station, wherein the frame further comprises a time indication field for the transmission of the buffered data by the station or of a time limit until which an allocation of resource unit is not needed by the station, wherein the buffer status report comprises:

an identifier indication identifying a type of the buffered data;

a buffer status report duration unit indication identifying a time unit used to express the time indication; and wherein, if the amount of the buffered data is not zero, the time indication is representative of a time limit for the transmission of the buffered data by the station and wherein the resource unit is allocated prior to the time limit.

21. The method of claim 20, wherein the time indication field is included into the buffer status report field.

22. The method of claim 20, wherein the time indication field is included in the frame and is distinct from the buffer status report field.

* * * * *